United States Patent
Rodriguez et al.

(10) Patent No.: US 8,229,593 B2
(45) Date of Patent: Jul. 24, 2012

(54) DOCUMENT DESTRUCTION MANAGEMENT

(75) Inventors: Herman Rodriguez, Austin, TX (US);
Newton James Smith, Austin, TX (US);
Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 11/242,671

(22) Filed: Oct. 3, 2005

(65) Prior Publication Data

US 2007/0075168 A1    Apr. 5, 2007

(51) Int. Cl.
*G06F 7/00* (2006.01)
(52) U.S. Cl. ............ 700/224; 700/221; 700/275; 221/1; 222/65
(58) Field of Classification Search .................. 700/221, 700/223–224, 275; 241/33–36; 705/8; 221/1; 222/65
See application file for complete search history.

(56) References Cited

U.S. PATENT DOCUMENTS

| | | | |
|---|---|---|---|
| 4,166,030 A | 8/1979 | Lewis et al. | |
| 4,709,197 A | 11/1987 | Goldhammer et al. | |
| 4,957,243 A | 9/1990 | Kanagaki et al. | |
| 5,039,020 A | 8/1991 | Leuthold et al. | |
| 5,354,001 A * | 10/1994 | Hasegawa | 241/34 |
| 5,479,599 A | 12/1995 | Rockwell et al. | |
| 5,542,487 A * | 8/1996 | Schultz et al. | 178/4.1 A |
| 5,662,280 A | 9/1997 | Nishio et al. | |
| 5,813,015 A | 9/1998 | Pascoe | |
| 5,884,855 A | 3/1999 | Chang | |
| 5,975,445 A * | 11/1999 | Ko | 241/34 |
| 6,111,953 A | 8/2000 | Walker et al. | |
| 6,390,397 B1 | 5/2002 | Ko | |
| 6,499,665 B1 | 12/2002 | Meunier et al. | |
| 6,550,701 B1 | 4/2003 | Chang | |
| 6,561,444 B1 | 5/2003 | Yokomine et al. | |
| 6,588,687 B2 | 7/2003 | Castronovo | |
| 6,595,444 B2 | 7/2003 | Schwelling | |
| 6,719,226 B2 | 4/2004 | Rajewski | |
| 6,731,411 B1 | 5/2004 | Walforst | |
| 6,766,971 B2 | 6/2004 | Van Der Beek et al. | |
| 6,758,392 B2 | 7/2004 | Bennett et al. | |
| 6,763,997 B2 | 7/2004 | Bennett et al. | |
| 6,774,571 B2 | 8/2004 | Choi et al. | |
| 6,779,747 B2 | 8/2004 | McLean et al. | |

(Continued)

FOREIGN PATENT DOCUMENTS

JP    2000185449 A    7/2000

(Continued)

OTHER PUBLICATIONS

USPTO Office action for U.S. Appl. No. 11/869,828 dated Jun. 25, 2010.

(Continued)

*Primary Examiner* — Kakali Chaki
*Assistant Examiner* — Sheela S Rao
(74) *Attorney, Agent, or Firm* — Yee & Associates, P.C.; David A. Mims, Jr.

(57) ABSTRACT

A computer implemented method for object destruction. An object is detected in a receptacle and identified. Based on the type of object identified, the object may be destroyed in a shredder and a confirmation of the destruction of the object is recorded for reference. The object may also be directed to a secure bin where it will not be destroyed.

7 Claims, 5 Drawing Sheets

U.S. PATENT DOCUMENTS

| | | | |
|---|---|---|---|
| 6,781,823 B1* | 8/2004 | Nyack | 361/683 |
| 6,978,954 B2 | 12/2005 | Kroger et al. | |
| 6,983,903 B2 | 1/2006 | Chang | |
| 7,183,923 B2* | 2/2007 | Sasaki et al. | 340/572.1 |
| 7,386,882 B2 | 6/2008 | Zentner et al. | |
| 7,551,300 B2 | 6/2009 | Wolfman et al. | |
| 7,636,724 B2 | 12/2009 | de la Torre et al. | |
| 2002/0070300 A1 | 6/2002 | McLean et al. | |
| 2002/0077875 A1* | 6/2002 | Nadir | 705/8 |
| 2003/0006325 A1 | 1/2003 | Castronovo | |
| 2003/0042342 A1 | 3/2003 | Kroger et al. | |
| 2003/0065656 A1 | 4/2003 | De la Torre et al. | |
| 2003/0141828 A1* | 7/2003 | Choi et al. | 315/248 |
| 2003/0146275 A1 | 8/2003 | Bennett et al. | |
| 2003/0146276 A1 | 8/2003 | Bennett et al. | |
| 2004/0140383 A1 | 7/2004 | Chang | |
| 2005/0067479 A1 | 3/2005 | Albi | |
| 2006/0285147 A1* | 12/2006 | Wolfman et al. | 358/1.14 |
| 2007/0019244 A1* | 1/2007 | Rekiere | 358/3.28 |
| 2007/0063082 A1* | 3/2007 | Coleman | 241/101.2 |
| 2008/0029628 A1 | 2/2008 | Rodriguez et al. | |

FOREIGN PATENT DOCUMENTS

JP          2003062476 A          3/2003

OTHER PUBLICATIONS

USPTO Response to Office Action regarding U.S. Appl. No. 11/826,828, dated Sep. 22, 2010.

USPTO Final Office Action regarding U.S. Appl. No. 11/826,828, dated Mar. 15, 2011.

USPTO Response to Office Action regarding U.S. Appl. No. 11/826,828, dated Jun. 13, 2011.

* cited by examiner

DOCUMENT DESTRUCTION MANAGEMENT

BACKGROUND OF THE INVENTION

1. Field of the Invention

The present invention relates generally to managing documents. Still more particularly, the present invention relates to a computer implemented method, apparatus, and computer usable program code for managing document destruction.

2. Description of the Related Art

Currently, many businesses have an occasion to discard confidential data. This confidential data includes, for example, customer lists, price lists, sale statistics, drafts of bids, correspondence, business plans, and technical information. Examples of documents that are discarded on a regular basis are business records after the retention period for these documents has expired. This type of information may be of interest to competitors. Additionally, businesses also are entrusted with information that must be kept private and confidential.

Customers of businesses often expect that their information will be kept confidential and out of the hands of others. This confidential data often is in the form of documents submitted by customers or others. Additionally, these documents may be ones generated by the business during the ordinary course of business.

Without proper safeguards, these types of documents typically end up in a trash bin or dumpster where the documents are readily available to anybody who desires to look through these waste containers.

An acceptable method for discarding stored documents is to destroy them by a method that ensures that the information cannot be obtained by others. One popular method of destroying documents involves shredding documents. The documents are placed into a device or apparatus that cuts up or shreds the documents into tiny pieces such that the confidential or private information contained on those documents cannot be read.

Oftentimes, businesses keep records of the document destruction as a means to verify that documents have been destroyed. A business may destroy documents using its own employees and equipment, or oftentimes, a business will enlist a document destruction service to destroy the documents. These types of services often document the date that materials are destroyed with a certificate of destruction. In documenting the destruction of documents, these certificates are used to ensure that documents that should be destroyed through document retention policies are destroyed according to these policies. These certificates are used to avoid a negative inference that documents may have been destroyed for improper purposes.

Another issue is controlling or managing the destruction of documents. Safeguards against destroying valuable records or records needed for other purposes are hard to implement. With the large amounts of documents being destroyed on a daily basis, it is difficult to verify whether every document should or should not be destroyed.

SUMMARY OF THE INVENTION

The present invention provides a computer implemented method, apparatus, and computer usable code for shredding objects. The apparatus has a number of components including a receptacle that is configured to receive objects. A shredding unit is connected to the receptacle, wherein the shredding unit selectively destroys the objects placed into the receptacle. An object detector is used to detect the presence of an object in the receptacle. An object identifier identifies objects placed into the receptacle. The apparatus also has a memory and a connector. The connector is used to establish a communications link with a data processing system. A controller in the apparatus stores identifications of objects identified by the object identifier in the memory and sends a signal to the shredding unit to control shredding of the objects.

The controller has a plurality of modes of operation. A first mode of operation is responsive to an object being placed in the receptacle for destruction. In this first mode the controller generates an identification of the object using the object identifier, stores the identification of the object in the memory, and sends the signal to the shredding unit to shred the object. In a second mode of operation, responsive to the communications link to the data processing system being established, the controller sends identifications stored in the memory to the data processing system. A third mode of operation is responsive to the communications link to the data processing system being present in which the controller identifies another object placed into the receptacle, the controller generates another identification of the another object, and the controller determines whether to send the signal to the shredding unit to destroy the another object based on the another identification of the object.

In the third mode of operation, the controller sends the another identification of the another object to the data processing system and receives a response as to whether the another object is to be destroyed. In the third mode of operation, the controller compares the identification of the another object with a collection of object identifications and makes a determination to destroy the another object if the another identification is not present in the collection of object identifications. In this third mode of operation, if the determination to destroy the object is absent, the controller causes the another object to be moved to a secure bin.

The object shredding apparatus also comprises a bin connected to the shredding unit, wherein the shredding unit deposits shredded material generated by shredding the objects in the bin. The apparatus also comprises a capacity sensor to determine an amount of shredded material.

The sending of the signal by the controller to the shredding unit may be controlled by the data processing system. The connector in the object shredding apparatus may be at least one of a serial port, a parallel port, a universal serial bus, a network interface card, a modem, a Bluetooth device, and a wireless communications unit.

The object shredding apparatus further comprises a control panel connected to the controller. The control panel is used to operate the object shredding apparatus. The controller may be, for example, a processor or an application specific integrated circuit.

The controller generates a proof of object destruction and transfers the proof of object destruction to the data processing system over the communications link. The controller also schedules a pickup for destroyed objects using the communications link. The object takes many forms, such as, for example, a document, an envelope, a floppy disk, a compact disk, credit card, or a DVD disk.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
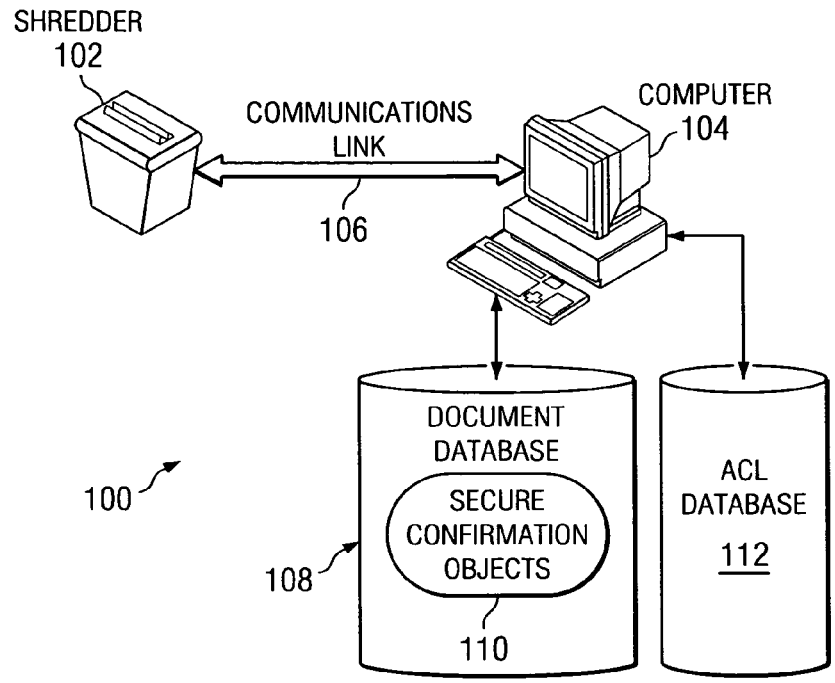
FIG. 1 is a document destruction system in accordance with an illustrative embodiment of the present invention.

With references now to the figures and in particular with reference to FIG. 1, a document destruction system is depicted in accordance with an illustrative embodiment of the present invention. Document destruction system 100 includes shredder 102 connected to computer 104 through communications link 106. This communications link may take various forms. For example, communications link 106 may be a physical wired link, an optical link, or even a wireless link. Different physical links that may be used include, for example, a universal serial bus (USB), a parallel port cable, a network cable, or a serial port cable. Wireless links may include a Bluetooth communications link, an I.E.E.E. 802.11G link, or an I.E.E.E. 802.11B wireless link.

Shredder 102 is computer controlled, meaning that computer 104 may send commands and data over communications link 106 to control the functionality and operation of shredder 102. Examples of commands that may be sent to shredder 102 from computer 104 include shred an object, read the identification of an object, read the status of the shredder, enable or disable standalone shredder operation, send a message to an output panel on shredder 102, and control the power to shredder 102.

Additionally, shredder 102 may send data back to computer 104 regarding document destruction activities. This information and other information may be stored in document database 108. For example, shredder 102 may send certifications that particular documents have been destroyed by shredder 102. These certifications may be stored as confirmation objects 110 by computer 104 within document database 108. Further, security and access control to shredding documents at shredder 102 are controlled through access control information in access control level (ACL) database 112.

Using these components, the aspects of the present invention provide a computer controlled shredder system in which computer 104 is employed to log shredding activity and set security levels for using the shredder. For example, shredding of documents may be allowed for a certain set of users through an administrator specified time schedule in which only specified types of documents or particular documents may be destroyed. The destruction of documents may be allowed only during certain periods of time.

In these illustrative examples, shredder 102 includes a capacity sensor to provide feedback on the current capacity and contents of destroyed documents. Shredder 102 also may contain a security log such that access to the shredded contents is available only when using a control panel that provides secured access. Shredder 102 may be employed to shred a variety of objects besides paper documents. For example, an envelope, a credit card, a floppy disk, a CD disk, or a DVD disk are examples of other objects that may be shredded using shredder 102.

Figure 2:
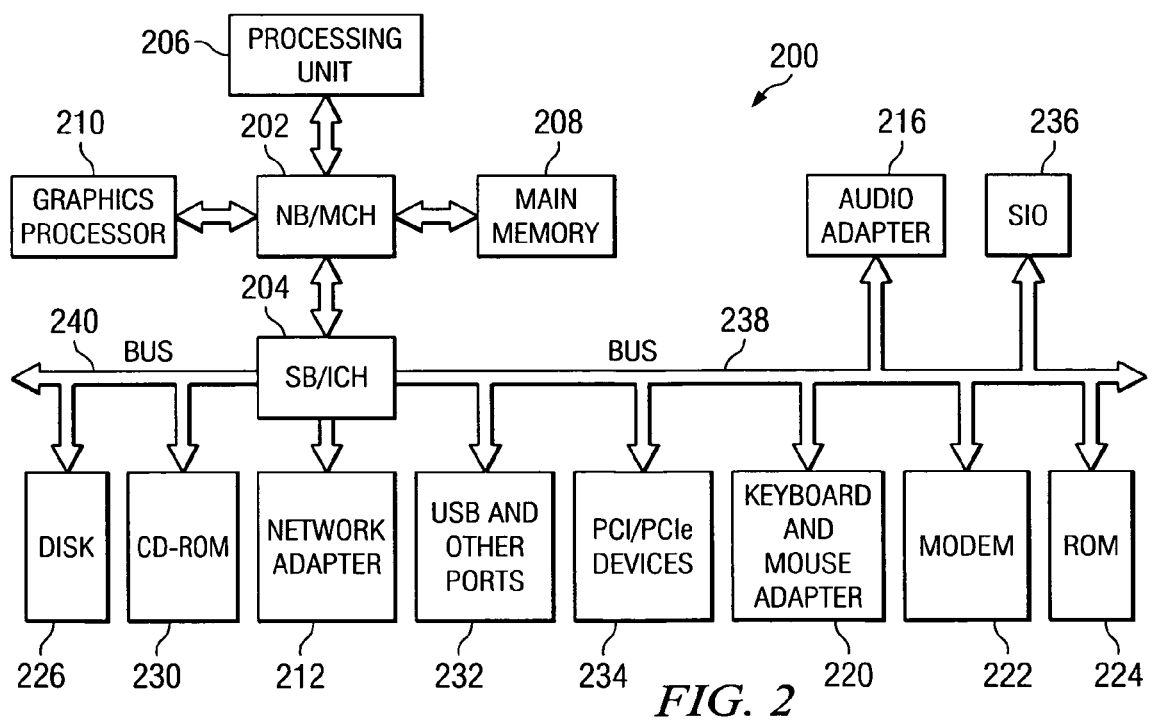
FIG. 2 is a block diagram of a data processing system shown in which aspects of the present invention may be implemented.

With reference now to FIG. 2, a block diagram of a data processing system is shown in which aspects of the present invention may be implemented. Data processing system 200 is an example of a computer in which code or instructions implementing the processes of the present invention may be located. In particular, data processing system 200 may be used to implement computer 104 in FIG. 1 to control shredder 102.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204. An example of an I/O device is a PC87308 super I/O chip from National Semiconductor Corporation.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIG. 2 and above-described examples are not meant to imply architectural limitations. For example, data processing system 200 also may be a tablet computer, laptop computer, or telephone device in addition to taking the form of a PDA.

Figure 3:
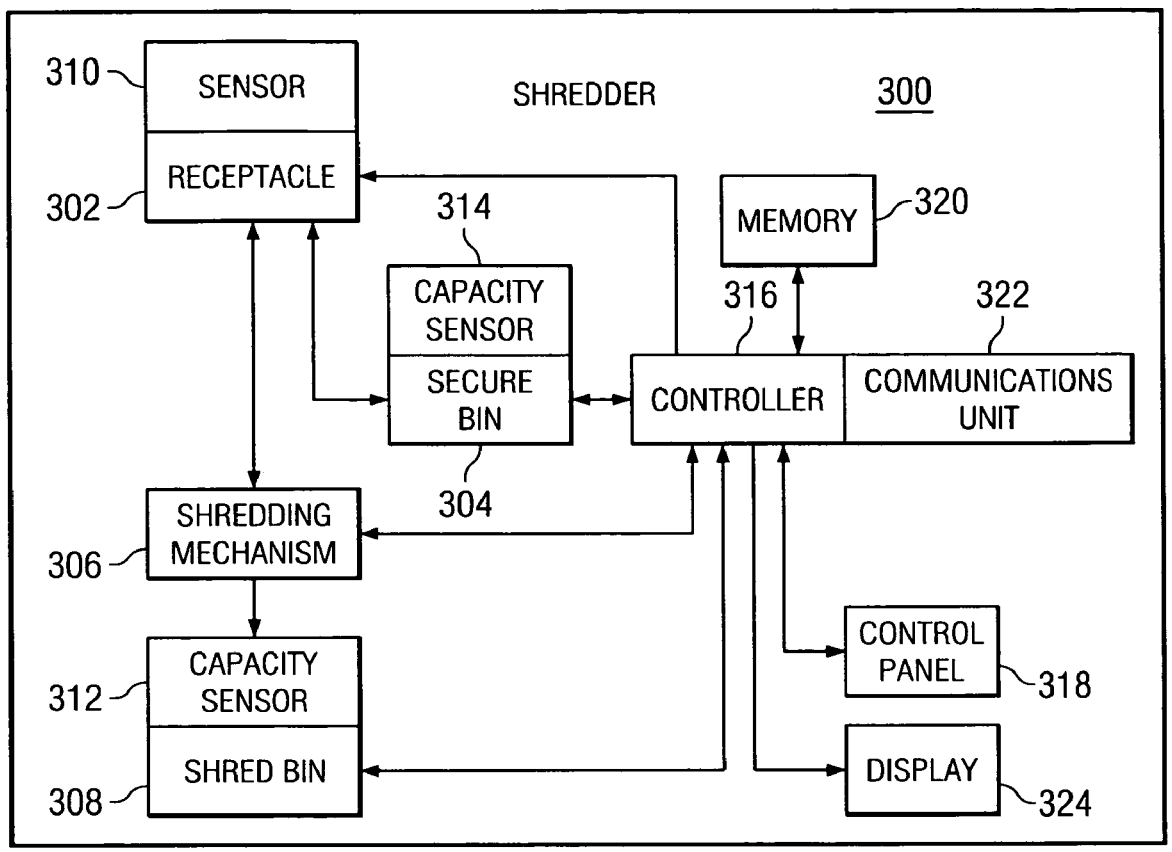
FIG. 3 is a diagram illustrating components in a shredder in accordance with an illustrative embodiment of the present invention.

Turning now to FIG. 3, a diagram illustrating components in a shredder is depicted in accordance with an illustrative embodiment of the present invention. Shredder 300 illustrates components that may be found in a shredder, such as shredder 102 in FIG. 1.

In this illustrative example, shredder 300 contains receptacle 302, secure bin 304, shredding mechanism 306, and shred bin 308. Receptacle 302 contains sensor 310, which is used to detect when a document is present within receptacle 302. Sensor 310 may be a device such as a switch that is flipped or tripped when a document is inserted into receptacle 302. Some other examples of types of sensors that may be used to detect a presence of a document and receptacle 302 include a radio frequency identifier (RFID) label, a light beam, a weight scale, or a heat sensor. Secure bin 304 and shred bin 308 each contain capacity sensors 312 and 314 in these examples. These sensors are used to determine the remaining capacity or how full these bins are as objects are processed by shredder 300. Other sensors that may be used to determine the capacity or how full the bins are include, for example, weight sensors and light beam sensors.

Controller 316 has connections to receptacle 302, secure bin 304, shredding mechanism 306, shred bin 308, sensor 310, capacity sensor 312, and capacity sensor 314. Controller 316 controls these components in accordance with the illustrative embodiments of the present invention as described herein. Additionally, controller 316 also receives input signals from different components, such as sensor 310, capacity sensor 312, and capacity sensor 314 and performs various functions as described below. Controller 316 may take various forms. For example, controller 316 may be a processor or an application specific integrated circuit (ASIC).

Controller 316 also is connected to control panel 318, memory 320, communications unit 322, and display 324. Memory 320 may be a single storage device or a combination of different types of storage devices depending on the particular implementation. For example, memory 320 may be a random access memory. In other illustrative embodiments, memory 320 may comprise a hard disk drive, a read-only memory, and a random access memory. Communications unit 322 allows for the establishment of a communications link, such as communications link 106 in FIG. 1. This communications unit allows for shredder 300 to communicate with and be controlled by a computer. Control panel 318 is provided to allow a user to control shredder 300 locally. Display 324 is used to display information and request input from users at shredder 300.

When an object is placed into receptacle 302, sensor 310 detects the presence of this object. In the illustrative examples, the objects are documents. Of course, the aspects of the present invention contemplate that managing the destruction of objects may include various types of physical objects other than just documents, such as, for example, envelopes, credit cards, transparencies, floppy disks, CD disks, and DVD disks. The presence of this document may be presented on display 324. A user may decide to destroy the document by providing the appropriate input into control panel 318. Control panel 318 may take various forms. For example, control panel 318 may present a keyboard with a number of keys labeled with the various operations that may be performed. This keyboard may take the form of a physical keyboard or may take the form of a touch screen that displays keys and the operations that may be performed selecting the displayed keys.

If the user selects a shred function, controller 316 causes receptacle 302 to send the document to shredding mechanism 306. Shredding mechanism 306 may take various forms. For example, shredding mechanism 306 may be a cross-cut shredder that cuts a document into snowflake-like pieces. In this form, shredding mechanism 306 comprises a housing with two sets of cutters installed on two rotating axis with a structure to direct a document through the sets of cutters. A motor is included in shredding mechanism 306 to drive the rotating axis to cut the document into pieces.

Shredding mechanism 306 also may provide for cutting documents into strips. The particular type of shredding mechanism employed may be any currently used shredding mechanism. The currently used shredding mechanisms are modified to be controlled through controller 316. These shredded or destroyed documents are sent into shred bin 308. Shredder 300 may be operated in a standalone manner or in a computer controlled mode through a communications link to a computer system such as computer 104 in FIG. 1. In this example, the operation is a standalone operation.

In these examples, sensor 310 also may include a document identifier. The document identifier is used to identify the object that has been placed into receptacle 302 for destruction. In these depicted examples, the document identification may be accomplished through a number of different mechanisms. The particular mechanism used depends on the particular implementation of the different aspects of the present invention. For example, a bar code or radio frequency identification (RFID) tag may be placed on the documents placed into receptacle 302. The use of a bar code or RFID tag reader in sensor 310 may be used to identify the particular document. Alternatively, the document identifier may be a scanner that is used to scan the document being placed into receptacle 302. The scanned document may be processed using optical character recognition (OCR) with the result being used to identify the document.

The identification of the document is stored by controller 316 in memory 320 when the document is destroyed by shredding mechanism 306. Controller 316 contains a log or list of identifications for documents destroyed in memory 320. Alternatively, these identifications may take the form of secure confirmation objects. A secure confirmation object contains the document identification, the time and date of destruction, and certificate information. All of this information is used to verify the destruction of documents. This information is stored in memory 320 until a communications link is established with a computer through communications unit 322. At that time, all data regarding stored documents may be electronically transferred to a computer or other data processing system from shredder 300.

When shredder 300 is in a computer-controlled mode, documents may be selectively destroyed. When an identification of a document occurs, the identified document may be analyzed to determine whether the destruction of that document is allowed. For example, a list of documents that cannot be destroyed may be created. If the document is on this list, then commands are sent to controller 316 to send the document to secure bin 304 rather than to shredding mechanism 306. Secure bin 304 in these illustrative examples is used to store documents that should not be destroyed. If the particular implementation does not contain secure bin 304, shredding mechanism 306 does not activate, and the documents remains in receptacle 302. Alternatively, such a determination also may be made in a standalone mode if a list of documents that should not be destroyed is saved to memory 320.

Capacity sensor 312 and capacity sensor 314 are employed to determine when secure bin 304 and shred bin 308 should be emptied. Signals from capacity sensor 312 and capacity sensor 314 may be used by controller 316 to indicate when the bins should be emptied.

In these illustrative examples, secure bin 304 and shred bin 308 have locks that are computer controlled. The access to these bins is controlled through controller 316. These bins are locked until the appropriate commands are entered through control panel 318 or received from a computer system through communications unit 322. In this manner, access to destroyed objects and undestroyed objects may be controlled.

Further, shredder 300 may provide for access controls through access control policies stored at a remote computer or stored in memory 320. In this manner, users who may use shredder 300 may be controlled. Additionally, the times during which shredding may occur also may be controlled using these access control policies.

Figure 4:
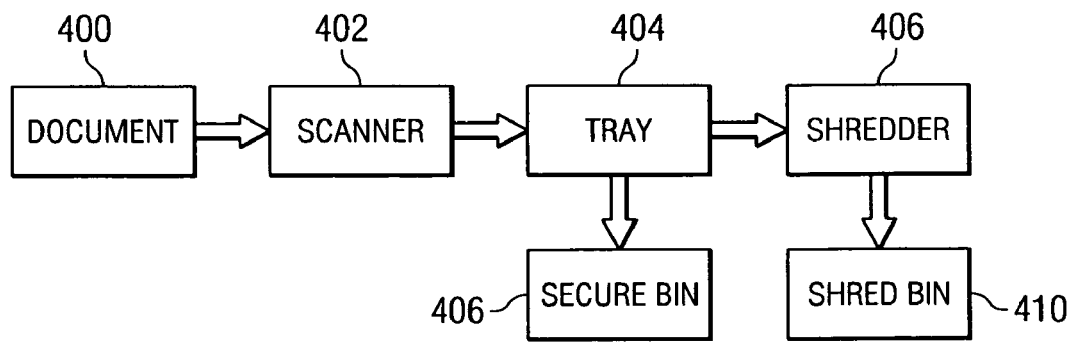
FIG. 4 is a diagram illustrating the flow of a document within a shredder in accordance with an illustrative embodiment of the present invention.

Turning now to FIG. 4, a diagram illustrating the flow of a document within a shredder is depicted in accordance with an illustrative embodiment of the present invention. In these examples, these components are components in a shredder, such as shredder 300 in FIG. 3. FIG. 4 illustrates the physical path taken by a document when placed into a shredder.

When document 400 is placed into the shredder, scanner 402 is used to identify document 400. Scanner 402 may be, for example, a bar code reader, an RFID tag reader, or a document scanner. The document is then placed into tray 404. Scanner 402 and tray 404 are located within receptacle 302 in FIG. 3 in these examples. The identification of the document may be used to determine whether the document can be shredded. If the document cannot be shredded, the document is then directed from tray 404 into secure bin 406. If shredding of document 400 is allowed, document 400 is sent to shredder 408, which destroys the document with the shredded pieces being deposited into shred bin 408.

Figure 5:
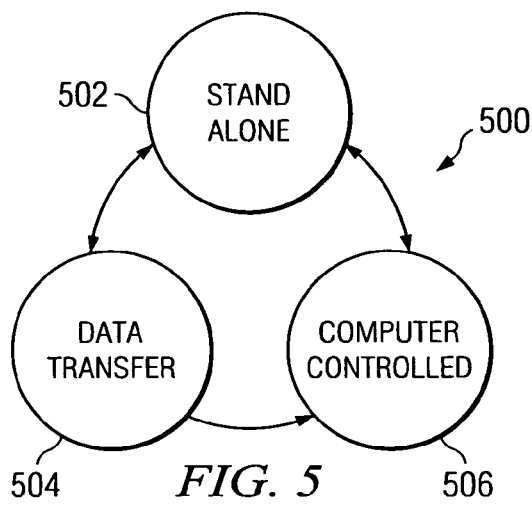
FIG. 5 is a diagram illustrating different modes of operation for a shredder in accordance with an illustrative embodiment of the present invention.

Turning now to FIG. 5, a diagram illustrating different modes of operation for a shredder is depicted in accordance with an illustrative embodiment of the present invention. In this example, state machine 500 illustrates the different states or modes in which a shredder, such as shredder 300 in FIG. 3 may be operated. In this example, a shredder starts in standalone state 502. In this state, the shredder may shred documents and store the identification of documents. Additionally, depending on the complexity and programming of the shredder, the shredder also may make determinations as to whether documents should be destroyed as well as when and what users may destroy documents.

State machine 500 shifts into data transfer state 504 from standalone state 502 when a communications link is established. In data transfer state 504, data relating to the destruction of documents is transferred to a computer system. From data transfer state 504, state machine 500 may shift into computer controlled state 506. Alternatively, the communications link may be terminated with state machine 500 returning to standalone state 502. State machine 500 also may move to computer controlled state 506 from standalone state 502 through the establishment of the communications link. Data transfer state 504 does not occur if data is not present to be transferred.

In computer controlled state 506, the shredder may be controlled remotely by the computer system. Additionally, data and commands may be sent to the shredder. For example, access control lists and lists of documents that cannot be destroyed may be transferred to the shredder for use in standalone state 502.

Figure 6:
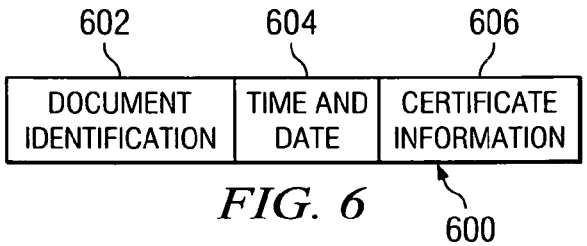
FIG. 6 is a diagram illustrating a document control record in accordance with an illustrative embodiment of the present invention.

Turning now to FIG. 6, a diagram illustrating a record is depicted in accordance with an illustrative embodiment of the present invention. In this example, record 600 is an example of a record created when a document is destroyed by shredder 300. In this example, record 600 contains document identification 602, time and date 604, and certificate information 606. The document identification may take various forms. For example, if the document identification has a bar code, the bar code number may be placed into document identification 602. Alternatively, a name or RFID tag identification information may be placed into this field. Time and date 604 identifies the time and date when the document was destroyed. Certificate information 606 provides information about the shredder destroying the document in these examples. Examples of other information that may be placed into certificate information 606 include, for example, a document identifier, document scanning info, information about who destroyed the document or where the document was destroyed, the size of the document, the weight of the document, the thickness of the document, and the page count for the document.

Record 600 may be placed into a list or log. Alternatively, this record may form a separate object, such as a secure confirmation object. This type of object may be stored with secure confirmation objects 110 within document database 108 in FIG. 1. As a secure confirmation object, record 600 is encrypted using a private key in these examples. This prevents alteration of record 600. Further, in the form of a secure confirmation object, record 600 can be accessed only with a public key by someone who needs to confirm destruction of the document.

Figure 7:
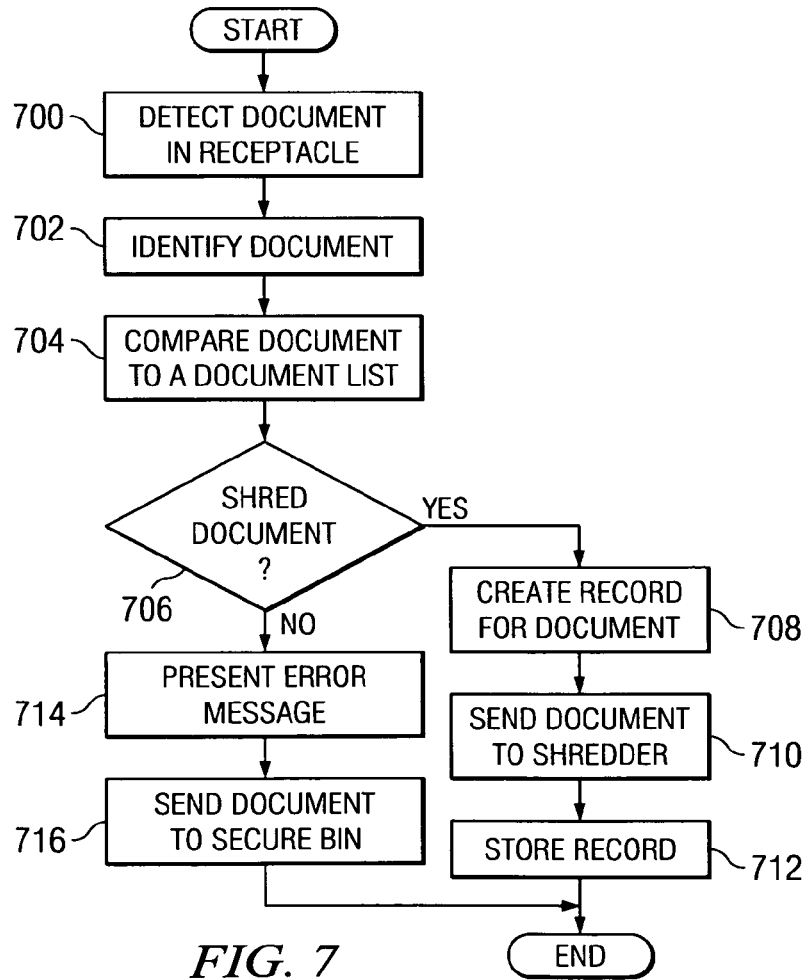
FIG. 7 is a flowchart illustrating a process for destroying documents in accordance with an illustrative embodiment of the present invention.

Turning now to FIG. 7, a flowchart illustrating a process for destroying documents is depicted in accordance with an illustrative embodiment of the present invention. The process illustrated in FIG. 7 may be implemented in a shredder, such as shredder 300 in FIG. 3. In particular, this process and other processes described below are implemented as a set of instructions for execution by controller 316 in FIG. 3 or as a set of circuits within controller 316 in FIG. 3. The process illustrated in FIG. 7 illustrates steps that are taken when a shredder is in a stand alone state, such as standalone state 502 in FIG. 5.

The process begins by detecting the presence of a document in the receptacle (step 700). The presence of the document may be detected through a sensor, such as sensor 310 in FIG. 3. The document is then identified (step 702). The document is compared to a document list (step 704). Thereafter, a determination is made as to whether the document should be shredded. In step 706, the determination is made from the comparison in step 704. In this example, the document list is one containing documents that should not be destroyed. If the document identified in step 702 is present on the list, then the document is not to be shredded. If the document can be shredded, the process creates a record for the document (step 708), and sends the document to the shredder (step 710).

In these examples, the record at a minimum contains the identification of the document being destroyed. Record 600 in FIG. 6 is an example of a record that is created in step 708. Additionally, this record also may include other information, such as, for example, the time and date of destruction, and certification information for the shredder. This record may be a simple entry in a list. Alternatively, the record also may be, for example, a secure confirmation object. This type of object contains the document ID, the time and date of destruction as well as the certification information.

Further, the secure confirmation object is encrypted using a private key for the shredder. As a result, this object cannot be altered and the object may be decrypted only through a public key by anyone who needs to confirm the destruction of the documents. The record is then stored (step 712) with the process terminating thereafter.

With reference again to step 706, the document should not be shredded, an error message is presented (step 714). This error message may be presented on a display, such as display 324 in FIG. 3. The document is then sent to a secure bin (step 716) with the process terminating thereafter. The secure bin is the secure bin, such as secure bin 304 in FIG. 3. This secure bin is used to hold the document so that the document may be placed back into the appropriate location.

Figure 8:
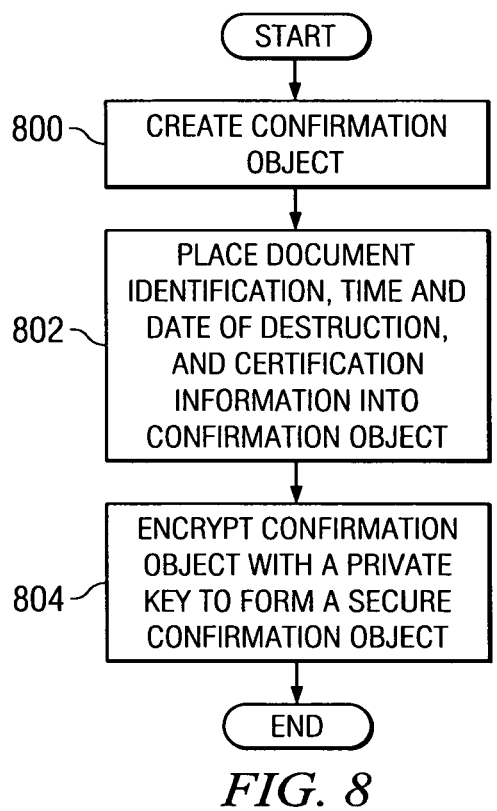
FIG. 8 is a flowchart of a process for creating a secure confirmation object in accordance with an illustrative embodiment of the present invention.

Turning next to FIG. 8, a flowchart of a process for creating a secure confirmation object is depicted in accordance with an illustrative embodiment of the present invention. The process illustrated in FIG. 8 is a more detailed description of step 708 in FIG. 7. This process is one way in which a record may be created.

The process begins by creating a confirmation object (step 800). The document identification, the time and date of destruction, and certificate information are placed into the confirmation object (step 802). The process then encrypts the confirmation object with a private key to form a secure confirmation object (step 804) with the process terminating thereafter. This secure confirmation object cannot be altered without the private key. Additionally, the secure confirmation object may be viewed only through the use of a public key.

Figure 9:
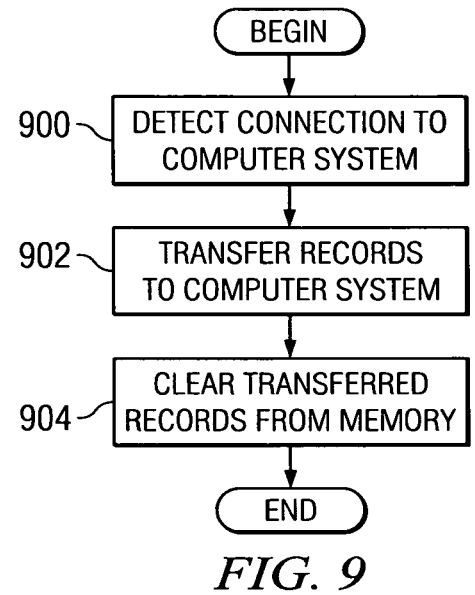
FIG. 9 is a flowchart of a process for transmitting document destruction data in accordance with an illustrative embodiment of the present invention.

Turning now to FIG. 9, a flowchart of a process for transmitting document destruction data is depicted in accordance with an illustrative embodiment of the present invention. The process illustrated in FIG. 9 is implemented in a shredder, such as shredder 300 in FIG. 3. In particular, these are processes implemented by controller 316 within shredder 300 in FIG. 3. This process occurs when the shredder enters a data transfer state, such as data transfer state 504 in FIG. 5.

The process begins by detecting a connection to a computer system (step 900). The process then transfers all records to the computer system (step 902). The transferred records are then cleared from the memory in the shredder (step 904) with the process terminating thereafter.

Figure 10:
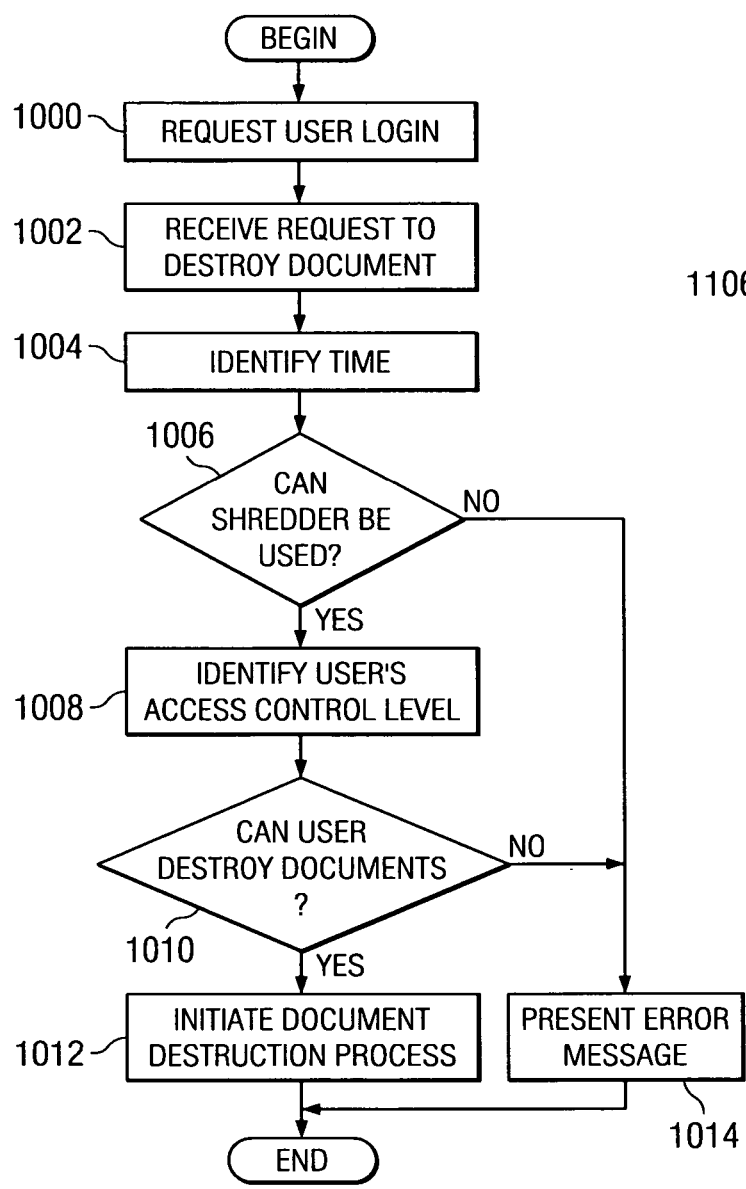
FIG. 10 is a flowchart of a process for destroying documents in accordance with an illustrative embodiment of the present invention.

With reference now to FIG. 10, a flowchart of a process for destroying documents is depicted in accordance with an illustrative embodiment of the present invention. The process illustrated in FIG. 10 may be implemented in a shredder, such as shredder 300 in FIG. 3. This process also may be implemented in a computer system, such as data processing system 200 in FIG. 2. When implemented in a computer system, the shredder is in a computer controlled state, such as computer controlled state 506 in FIG. 5. In this state, the different commands as to whether a document should be shredded or not shredded are sent by the computer to the shredder for execution.

The process begins by requesting a user log in (step 1000). This process is used to identify the user who desires to shred a document. The user log in may occur at a control panel, such as control panel 318 in shredder 300 in FIG. 3. Alternatively, the user may log in remotely at a computer, such as computer 104 in FIG. 1. The process then receives a request to destroy documents (step 1002). The time is then identified (step 1004). A determination is made as to whether the shredder can be used (step 1006). The value inserted into field 604 in FIG. 6 may also be based on this time. The different aspects of the present invention allow for schedules to be set as to when shredding may or may not occur.

If the shredder can be used, the process identifies the user's access control level (step 1008). A determination is made as to whether the user can destroy the document (step 1010). This access control level is used to identify which users may or may not destroy documents. Additionally, certain users may be allowed to destroy certain types of documents while other users may be allowed to destroy other types of documents. For example, only human-resource users may be allowed to destroy employee records, while technical documents may be destroyed only by programmers.

If the user is allowed to destroy the document, the process initiates a document destruction process (step 1012) with the process terminating thereafter. The document destruction process in step 1012 is similar to the process described in FIG. 7.

With reference again to step 1006, if the shredder cannot be used, an error message is presented (step 1014) with the process terminating thereafter. The process also proceeds to step 1014 if the user is not allowed to destroy documents.

The aspects of the present invention also provide an ability to schedule the removal of shredded material from a shredder. The different aspects of the present invention use the information about documents that have been shredded and a shredded history to predict when a shred bin will be full. With this information, the pick up of shredded material may be automatically scheduled. In these examples, the shredder maintains a log of documents that have been shredded for tracking purposes. This log also is used to measure or estimate the amount of shredded material located in the shred bin. The log contains historical information, such as the workload for different days of the week or days of the month. This historical information is used to generate a profile for each shredder that is being managed.

With this usage profile and the amount of shredded material currently present in a shred bin, the processes of the present invention can predict when a bin will be full and need to be emptied. As a result, requests to pick up and dispose of shredded material may be scheduled based on a projected time in the future when the bin will be full and transmit this information to a computer performing scheduling. In this manner, more efficient pick up of shredded material may be achieved. Additionally, the usage profile can be initially set to an expected average or manually set for peak times. The processes of the present invention then modify this profile to reflect the actual usage history.

Figure 11:
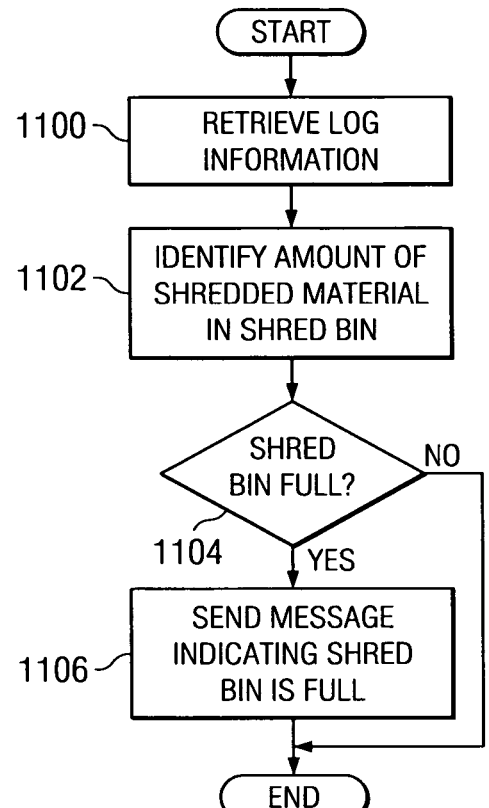
FIG. 11 is a flowchart of a process for obtaining a shredding history in accordance with an illustrative embodiment of the present invention.

Turning now to FIG. 11, a flowchart of a process for obtaining a shredding history is depicted in accordance with an illustrative embodiment of the present invention. The process illustrated in FIG. 11 may be implemented in a data processing system, such as data processing system 200 in FIG. 2.

The process begins by retrieving log information (step 1100). In this example, a log is retrieved from a shredder, such as shredder 300 in FIG. 3. The amount of shredded material in the trash bin is identified (step 1102). A determination is made as to whether the bin is full (step 1104). If the bin is full, a message is sent indicating that the shred bin is full with the process terminating thereafter. This message is used to indicate that a pick up is already needed for the shredder. If the shred bin is not full in step 1104, the process terminates. The process illustrated in FIG. 11 is used to retrieve information when the shredder moves into a data transfer state. In these examples, the log retrieved in step 1100 includes current information as to the fullness of the shred bin.

Figure 12:
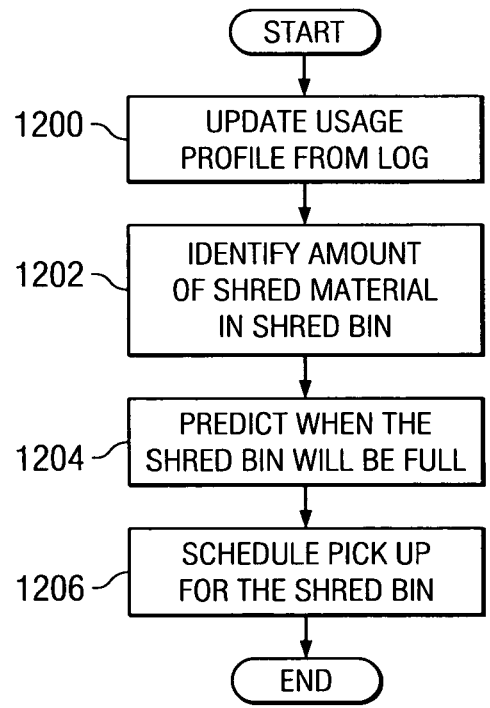
FIG. 12 is a flowchart of a process for estimating when a shred bin will become full in accordance with an illustrative embodiment of the present invention.

Turning now to FIG. 12, a flowchart of a process for estimating when a shred bin will become full is depicted in accordance with an illustrative embodiment of the present invention. The process illustrated in FIG. 12 may be implemented in a computer system, such as data processing system 200 in FIG. 2. This process is employed to predict when a pick up of shredded material is needed.

The process begins by updating a usage profile from the retrieved log (step 1200). This usage profile is generated from historical information on the usage of a shredder. This profile may identify usage for different days of the week as well as different days of the month or for different days within a year. The amount of shredded material in the shred bin is identified (step 1202). This identification is made from the information placed into the log retrieved from the shredder. Next, a prediction is made as to when the shred bin will be full (step 1204). Thereafter, a pick up for the shred bin is scheduled (step 1206). In step 1206, the scheduling is made by the data processing system sending a message or request to a pick up service or to a particular department or employee that is responsible for managing pick up of destroyed documents.

In this manner, the destruction of objects may be managed with more granularity and efficiency. The different aspects of the present invention allow for an identification of documents being destroyed by particular shredders. The information regarding the destruction of the document is transferred from a shredder to a computer system. Additionally, these shredders may be computer controlled with restrictions as to what users, what documents, and what times documents may be destroyed. Further, some users may be able to destroy some types of documents during some periods of time while other users may be able to destroy only other types of documents at other times.

The different aspects of the present invention also provide for an ability to automatically create and retrieve certification information for the destruction of particular documents. Further, the different aspects of the present invention allow for document destruction to be prevented when selected documents or users attempt to destroy documents.

The invention can take the form of an entirely hardware embodiment, an entirely software embodiment or an embodiment containing both hardware and software elements. In a preferred embodiment, the aspects of the present invention may be implemented in hardware and software. The software may include, but is not limited to firmware, resident software, and micro code.

The term "programmed method", as used herein, is defined to mean one or more computer implemented process steps that are presently performed; or, in the alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer perform one or more process steps. Finally, a programmed method comprises a computer system that has been programmed by software, hardware, firmware, or any combination thereof to perform the process steps.

It is to be understood that the term "programmed method" is not to be construed as simultaneously having more than one alternative form, but rather it is to be construed in the truest sense of an alternative form wherein, at any given point in time, only one of the plurality of alternative forms is present. Furthermore, the term "programmed method" is not intended to require that an alternative form must exclude elements of other alternative forms with respect to the detection of a programmed method in an accused device.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Telephoneline modems (including DSL), cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A programmed method for managing object destruction in a shredding apparatus, the method comprising:
    establishing a communications link between a controller in the shredding apparatus and a data processing system when the shredding apparatus is not in a standalone state;
    transferring, from the data processing system when the shredding apparatus is not in a standalone state, a list of documents that cannot be destroyed;
    saving, when the shredding apparatus is not in the standalone state, the list of documents that cannot be destroyed in a memory of the shredding apparatus;
    shifting, by the shredding apparatus, to a standalone state by removing the communications link between the controller in the shredding apparatus and the data processing system;
    after shifting to the standalone state, detecting by the shredding apparatus in the standalone state, a first document in a receptacle of the shredding apparatus;
    responsive to detecting the first document in the receptacle, generating, by the controller in the shredding apparatus in the standalone state, a first identification of the first document;
    determining, by the controller in the shredding apparatus in the standalone state, whether to destroy the first document based on the first identification of the first document, and the list of documents that cannot be destroyed in the memory of the shredding apparatus; and
    responsive to a determination by the controller in the shredding apparatus when the shredding apparatus is in the standalone state that the first document is on the list of documents that cannot be destroyed, sending the first document to a secure bin.

2. The programmed method of claim 1 further comprising:
    responsive to detecting a second document in the receptacle of the shredding apparatus in the standalone state, generating a second identification of the second document;
    determining, by the controller in the shredding apparatus in the standalone state, whether to destroy the second document based on a second identification of the second document and the list of documents that cannot be destroyed in the memory; and
    responsive to a determination by the controller in the shredding apparatus in the standalone state that the second object is not on the list of documents that cannot be destroyed, destroying the second document;
    responsive to destroying the second document, creating, by the controller, a confirmation object based on the destruction of the second object, wherein the confirmation object comprises:
    the second identification of the second object that the shredding apparatus destroyed;
    a time and date that the shredding apparatus destroyed the second document; and
    a certificate of information that provides information about the shredding apparatus that destroyed the second document, an identification of a person who destroyed the second document, an indication of a location of the shredding apparatus, a size of the second document, a weight of the second document, a thickness of the second document, and a page count of the second document;
    wherein a time during which the second document may be destroyed is determined by an access control policy stored in the memory of the shredding apparatus and controlled by the controller.

3. The programmed method of claim 2, further comprising:
    re-establishing a communications link to the data processing system; and
    transferring the confirmation object to the data processing system through the communications link.

4. The programmed method of claim 3:
    determining an access control level of a user and
    using the access control level, determining level whether the user is authorized to destroy the object.

5. The programmed method of claim 3, further comprising:
    creating a profile based on a frequency of usage of the shredding apparatus;
    identifying an amount of destroyed objects in a shred bin of the shredding apparatus;
    predicting when the shred bin will become full based on the profile and the identified amount of destroyed objects in the shred bin; and
    scheduling a pick up for the destroyed objects in the shred bin based on the prediction.

6. The programmed method of claim 2, wherein the confirmation object is encrypted with a private key to form a secure confirmation.

7. The programmed method of claim 1 further comprising:
    responsive to sending the first document to the secure bin, locking the secure bin by a lock operably coupled to the controller; and
    sending an error message to a display on the shredding apparatus.

* * * * *